3,350,369
FERROCENE-CONTAINING MONOMERS AND POLYMERS AND PROCESS FOR PREPARING SAME

Harold Rosenberg, Dayton, Ohio, and Steve Gust Cottis, Buffalo, N.Y., assignors to the United States of America as represented by the Secretary of the Air Force
No Drawing. Filed June 2, 1964, Ser. No. 372,128
6 Claims. (Cl. 260—80)

The present invention relates to poly(cyclopentylene-ferrocenylenes) or ferrocene polymers of high molecular weight and to a process for the preparation thereof.

Since its discovery in 1951, ferrocene or bis(cyclopentadienyl) iron, a metallo-organic substance in which two cyclopentadienyl rings are bonded to a single iron atom in a "sandwich-type" structure, has been widely recognized for its unusual resistance to high temperatures. With the progression of nuclear and space exploration, even more attention has been focused on ferrocene and various substituted compounds thereof because of their high stability under nuclear or ultraviolet radiation, their fluidity over wide temperature ranges, low volatility, high dielectric strength, antioxidant effects and so on. While such ferrocenes have been employed with other compounds, as solid or liquid components of fuel, lubricant or coating formulations, such as combustion additives, lubricant oxidation inhibitors and coating additives, few polymeric derivatives have been developed in which ferrocene nuclei or moieties are contained in the backbone of high molecular-weight chains. Furthermore, although the possibility of developing synthetic polymers composed of repeating ferrocenylene units has been demonstrated, laboratory results have indicated that the homopolymers are not likely to possess desired physical and mechanical properties to make them suitable for engineering applications.

If properties rendering them suitable for use as structural or protective materials are to be achieved in ferrocene-containing macromolecules, it has been found that the ferrocenylene moieties in the polymeric structures must be separated by suitable spacer atoms or groups of atoms. While it has been known previously that the ferrocene molecules could be cleaved to yield distinct cyclopentenyl or cyclopentylferrocene isomers, there has heretofore been no suggestion that such cleavage can also play an important part in the development of the ferrocene polymers. On the other hand, certain reactions involving ferrocene were known to produce materials of higher molecular weights, but the nature and the mechanisms of such reactions were not correctly understood and were not amenable to the development of polymerizing techniques. The state of the art prior to the within invention has in fact failed properly to define and interpret the structures that have resulted from the most closely related ferrocene reactions. Consequently an accurate understanding of the possibilities for polymer formation has been lacking and synthesis has been impossible, at least with any reasonably accurate and predictable results. It is accordingly an object of the present invention to provide poly(cyclopentyleneferrocenylene) or ferrocene polymers containing cyclopentylene spacer units between ferrocene nuclei.

Still another object of the invention is to provide processes yielding ferrocene polymers.

Still a more specific object of the present invention is to provide monomeric materials and methods for handling the same which will lead to a variety of ferrocene polymers.

Still a further object of the present invention is to provide ferrocene-containing materials possessing the desired properties of ferrocene derivatives such as high-melting or softening point, high-temperature strength and resistance to degradation, radiation resistance and the like wherein the ferrocene moiety is incorporated in the material as an integral part of the macromolecule.

These and other objects and advantages which will be apparent from a reading of the following disclosure are achieved by the teachings herein based upon the discovery that the dissolving of ferrocene in an organic solvent and in the presence of a Lewis acid catalyst such as aluminum chloride not only causes the ferrocene moiety to split and to temporarily produce cyclopentylene rings as separate and reactive cyclopentadiene or cyclopentene entities, but also enables these rings to reattach themselves to other ferrocene nuceli in such a manner that the new union becomes a unit which may become joined to successive units to form a polymeric material of high molecular weight. The ferrocene thus might be said to be cleaved to give a variety of cycloalkyl-substituted ferrocene derivatives in which a cyclopentylene moiety is the spacer group in the polymeric ferrocene structures.

To obtain such ferrocene polymers therefore, the present invention teaches putting ferrocene and a Lewis acid catalyst such as aluminum chloride, together in solution and allowing sufficient time, depending upon the reaction conditions such as the nature of solvent employed, the ratio of aluminum chloride to ferrocene, temperature and the like, for polymerization to take place and thereafter separating the polymer. Depending further upon the reaction conditions, it has been found that three basic types of ferrocene derivatives or polymers are obtainable as follows: (1) Compounds containing mers or repetitive units consisting of a ferrocene nucleus joined to a cyclopentylene ring; (2) compounds containing mers or repetitive units consisting of a ferrocenylene nucleus between two cyclopentylene rings and; (3) compounds containing one or more mers or repetitive units having one cyclopentylene ring between two ferrocene nuclei.

The structure of each of these types is as follows:

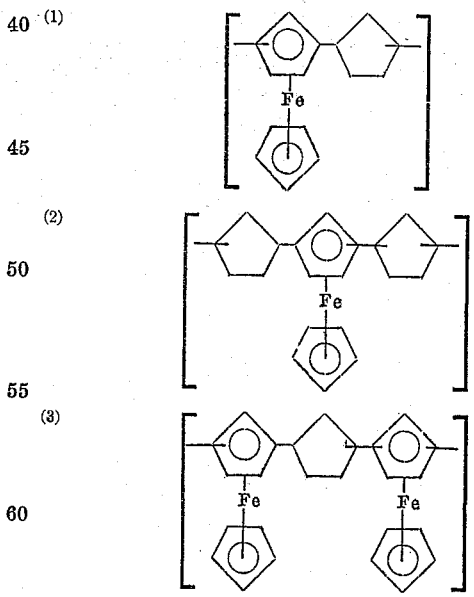

While any solvent in which the ferrocene can dissolve and which will not itself react with the Lewis acid catalyst while at the same time allowing the Lewis acid to act as a catalyst or otherwise to react therein is suitable for the purposes of this invention, the alkylene halides such as methylene chloride, ethylene chloride, chloroform and carbon tetrachloride have been found particularly satisfactory. Other solvents such as aromatic hydrocarbons, and particularly benzene and toluene, meeting the aforementioned requirements may however, be advantageously employed. Experimentation has confirmed that where an alkylene halide, such as methylene chloride or ethylene chloride, is employed as the solvent and the mole ratio of the Lewis acid catalyst, such as aluminum chloride to the ferrocene therein is relatively equivalent on the order of from 1.0:1.0 to 1.05:1.0, and temperatures, on the order of from 40° C. to 85° C. are applied for a period of 5 to 15 hours, a reaction according to the following equation takes place:

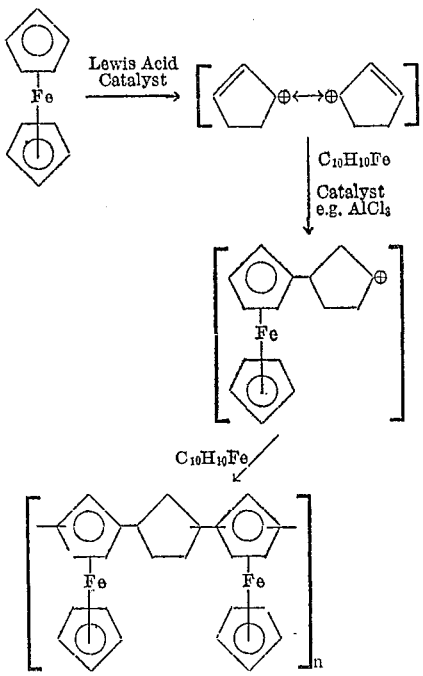

wherein $n$ is an integer, and

which indicates a 5-carbon cyclic saturated or cyclopentylene ring group. However, at lower temperatures and with higher concentrations to the point of an excess of aluminum chloride, the ratio of cleavage products of the ferrocene to the unreacted ferrocene is favored and this, in turn, had lead to the formation of products of the type according to the following equation:

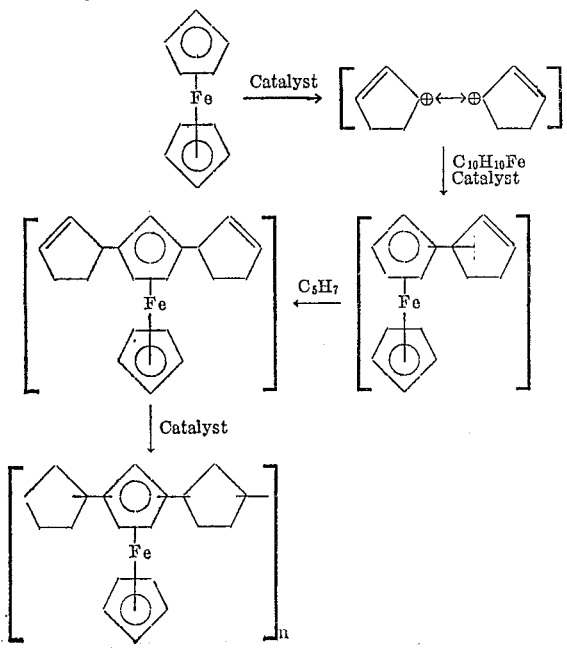

wherein $n$ is an integer from one to fifty. Conditions intermediate to the foregoing appear to have led to compositions possessing the following structure as mers or repetitive units.

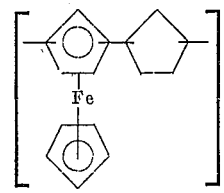

Some specific examples of the methods for practicing the within invention and the results obtained therefrom are as follows:

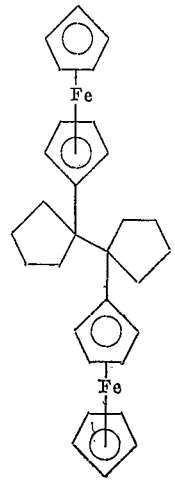

*Example I.—1,1'-bis(ferrocenyl) bicyclopentyl*

To a solution of 37.2 grams (0.2 mole) of ferrocene in 700 milliliters of anhydrous ethylene chloride, cooled to from zero to five degrees centigrade, was added 40 grams (0.15 mole) of anhydrous granular aluminum chloride with stirring. The reaction mixture was stirred at zero degrees centigrade for 5 hours and then stirred at room temperature for 16 hours. The mixture was then poured slowly, with stirring, into 1000 milliliters of water and 45 grams of sodium sulfite was then added with continued stirring. The solution was filtered and the ethylene chloride layer separated. After removal of the solvent by evaporation, the residue (32.4 grams) was treated with 100 milliliters of hot cyclohexane. After cooling the mixture was filtered and the filtrate evaporated to dryness. The dark brown residue was treated with 200 milliliters of boiling diethyl ether and filtered, with stirring, into 1000 milliliters of methanol. The residue was treated with 100 milliliters of diethyl ether and then filtered into stirred methanol. The brown residue (2.5 grams, M.P. 200° C.) was separated by filtration from the methanol ether solution from which a yellow solid (8.2 grams, M.P. 60–100° C.) was precipitated on standing. The methanol ether filtrate was concentrated to a total volume of 300 milliliters and a resinous material was found to precipitate from solution. The mixture was allowed to stand at zero degrees centigrade for 16 hours, the supernatent liquid decanted, and the resinous deposit dissolved in 150 milliliters of petroleum ether (B.P. 30–60° C.). The solution was then chromatographed on a column (9 cm. x 25 cm. radius) containing activated neutral alumina. Several bands were formed on the column from the petroleum ether solution. The lowest band (0.3 gram of ferrocene) was eluted with petroleum ether (B.P. 30–60°). A second band (primarily ferrocene) was eluted with cyclohexane. The main band was eluted with diethyl ether and the solvent evaporated to give 4.1 grams of a red-orange resin. [Analysis.—Calcd. for $C_{30}H_{34}Fe_2$: C, 71.17%; H, 6.77%; Fe, 22.06% molecular weight 506. Found: C, 71.06%; H, 6.65%; Fe, 21.81%; molecular weight (osmometrically in benzene) 509.]

*Example II.—Tris-(1,2- or 1,3-ferrocenylenedicyclopentylene)*

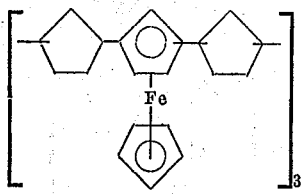

Tris-(1,2- or 1,3-ferrocenylenedicyclopentylene) may be obtained by the same method described above in connection with Example I except that the yellow solid formed in the original methanol-ether solution, having M.P. 60–100° C., was further extracted in a Soxhlet extractor with methanol and the orange methanol solution evaporated to dryness. The residue was dissolved in petroleum ether (B.P. 30–60° C.) and, after removal of solvent was placed in a Soxhlet extractor and extracted with diethyl ether. The ether extract was added with stirring to 400 milliliters of methanol to give 1.6 grams of a yellow solid. On repeated precipitations of this solid dissolved in tetrahydrofuran from 1:1 methanol-diethyl ether solutions, the trimer was obtained as a yellow brown solid, M.P. or softening point 178–180° C. [Analysis.—Calcd. for $C_{60}H_{70}Fe_3$: C, 75.17%; H, 7.35%; Fe, 17.47%; molecular weight 958. Found: C, 75.25%; H, 7.21%; Fe, 17.29%; molecular weight osmometrically in benzene) 1000.]

*Example III.—Poly(1,2- or 1,3-cyclopentylene-1,2- or 1,3-ferrocenylene)*

A mixture of polymers having the general structure

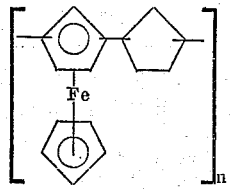

wherein $n$ is an integer may be obtained by the same general method described in Example I with the exception that methylene chloride is employed as the solvent in place of the ethylene chloride.

Individual polymers, whose melting points and analytical data are shown in Table I below, have been separated and isolated in the form of yellow powders by precipitation procedures similar to those used in Example I.

TABLE I.—PHYSICAL PROPERTIES AND ANALYSES OF $(C_{15}H_{16}Fe)_n$

| $n$ | Melting range, °C. | Carbon, Percent | | Hydrogen, Percent | | Iron, Percent | |
|---|---|---|---|---|---|---|---|
| | | Calcd. | Found | Calcd. | Found | Calcd. | Found |
| 4 | 97–101 | 71.46 | 71.37 | 6.34 | 6.51 | 22.20 | 23.07 |
| 5 | 126–130 | 71.46 | 71.50 | 6.34 | 6.55 | 22.20 | 21.66 |
| 6 | 138–140 | 71.46 | 71.35 | 6.34 | 6.18 | 22.20 | |

The calculated molecular weight of the molecule wherein $n$ is equal to four is 1008 whereas the molecular weight (benzene) found therefor was 978. Where $n$ is equal to five, the calculated molecular weight is 1260 whereas the molecular weight found was 1230; and, in the case of the polymer where $n$ equals six, the actual molecular weight was found to be 1500 as against a calculated 1512.

Particular Lewis acids which are known to be useable as the catalyst in the polymerizing reactions as set forth above include, in addition to the aluminum chloride, hydrogen fluoride, phosphoric acid, stannic chloride and ferric chloride. Depending upon the solvent employed, the proportions of the various ingredients and the yields to be achieved, the temperatures at which the polymerization takes place may range from minus 20 degrees centigrade to 85 degrees centigrade in the case of the alkylene halide solvents and to 150 degrees centigrade in the case of aromatic solvents such as benzene, toluene, o-, m- and p-xylene and ethylbenzene. As indicated in the above Examples, stirring of the ingredients should be continuous; and, while observable amounts of polymer are obtainable after stirring for as low as two hours, the polymer yield in most cases will continue to increase where stirring is maintained up through sixteen hours and beyond. Upon completion of the polymerization, the polymers are obtained by various repeated extraction procedures such as the chromatographic techniques described.

With the ferrocene nucleus thus incorporated and the properties thus made available, polymers according to the present invention are useful as ignition or combustion-control additives for a wide variety of fuels, as thermally stable base polymers and additives for coatings which are radiation resistant, particularly to degradation under ultra-violet exposure, and as dielectrics or insulation materials. The anti-oxidant and/or anti-gel properties of such polymers also render them particularly adaptable for use as additives to high temperature lubricants or other fluids.

While the present invention has been described in considerable detail in connection with certain specific examples and preferred embodiments, it is to be understood that this particularization has been for the purposes of illustration only and does not limit the scope of the invention as it is defined in the subjoined claims.

We claim:

1. A process for making 1,1'-bis(ferrocenyl)bicyclopentyl by dissolving 37.2 grams (0.2 mole) of ferrocene in 700 milliliters of anhydrous ethylene chloride at a temperature between 0° C. to 5° C.; adding to the solution 40 grams (0.15 mole) of anhydrous granular aluminum chloride with stirring for 5 hours; stirring the solution at room temperature for 16 hours; pouring the solution slowly with stirring into 1000 milliliters of water; adding to the solution 45 grams of sodium sulfite with continuous stirring; filtering the solution; separating the ethylene chloride layer; removing the solvent by evaporation to isolate the residue; adding 100 milliliters of hot cyclohexane to the residue; cooling the mixture; filtering the mixture; evaporating the filtrate to dryness to yield a dark brown residue; adding substantially 200 milliliters of boiling diethyl ether to the residue; filtering the ether solution of the residue mixture with stirring into 1000 milliliters of methanol; separating by filtration from the methanol-ether solution a yellow solid that precipitates on standing; concentrating the methanol-ether filtrate to a total volume of 300 milliliters; causing the solution to stand at 0° C. for 16 hours to permit a resinous material to precipitate from the solution; decanting off the supernatent liquid from the resinous material; dissolving the resinous material in 150 milliliters of petroleum ether; chromatographing the solution on a column containing activated neutral alumina to form several bands on the column from the petroleum ether solution; eluting the lowest band with petroleum ether; thereafter the second band, which contains primarily ferrocene, with cyclohexane; then eluting the main band with diethyl ether; and evaporating the solvent from the main band to isolate a red-orange resin product having a composition as determined by elemental chemical analysis of $C_{30}H_{34}Fe_2$ and a molecular weight (found) of 509.

2. The process for making tris-(1,2- or 1,3-ferrocenylenedicyclopentylene) by dissolving 37.2 grams of ferrocene in 700 milliliters of anhydrous ethylene chloride at a temperature between 0° C. to 5° C.; adding to the solution 40 grams of anhydrous granular aluminum chloride with stirring for 5 hours; stirring the solution at room temperature for 16 hours; pouring the solution slowly with stirring into 1000 milliliters of water; adding to the solution 45 grams of sodium sulfite with continuous stirring; filtering the solution; separating the ethylene chloride layer; removing the solvent by evaporation to isolate the residue; adding 100 milliliters of hot cyclohexane to the residue; cooling the mixture; filtering the mixture; evaporating the filtrate to dryness to yield a dark, brown residue; adding 200 milliliters of boiling diethyl ether to the residue; filtering the ether and residue mixture with stirring into 1000 milliliters of methanol; separating by filtration from the methanol ether solution a yellow solid that precipitates on standing; placing the yellow solid material in Soxhlet extractor with methanol and extract as an orange-colored solution; evaporating to dryness the orange methanol solution; dissolving the residue in petroleum ether; removing the solvent from the dissolved material; placing the residue in a Soxhlet extractor and extracting with diethyl ether; introducing the ether extract with stirring into 400 milliliters of methanol with the separation therefrom of a second yellow solid; repeating precipitations of the yellow solid dissolved in tetrahydrofuran from 1:1 methanol-diethyl ether solutions; and isolating the trimeric product as a yellow-brown solid having the composition $C_{60}H_{70}Fe_3$ as determined by elemental chemical analysis and having a softening point of 178–180° C. and a molecular weight (found) of 1000.

3. The process for making poly(1,2- or 1,3-cyclopentylene-1,2- or 1,3-ferrocenylene) by dissolving 0.2 mole of ferrocene in 700 milliliters of anhydrous methylene chloride at a temperature between 0° C. and 5° C.; adding to the solution 0.15 mole of anhydrous granular aluminum chloride with stirring for 5 hours; stirring the solution at room temperature for 16 hours; pouring the solution slowly with stirring into 1000 milliliters of water; adding to the solution 45 grams of sodium sulfite with continuous stirring; filtering the solution; separating the methylene chloride layer; removing the solvent by evaporation to isolate the residue; adding 100 milliliters of hot cyclohexane to the residue; cooling the mixture; filtering the mixture; evaporating the filtrate to dryness as a dark-brown residue; adding 200 milliliters of boiling diethyl ether to the residue; filtering the ether and residue mixture with stirring into 1000 milliliters of methanol; separating by filtration from the methanol-ether solution a yellow solid that precipitates on standing; concentrating the methanol-ether filtrate to a total volume of 300 milliliters; causing the solution to stand at 0° C. for 16 hours to permit a resinous material to precipitate from the solution; decanting off the supernatent liquid from the resinous material; dissolving the resinous material in 150 milliliters of petroleum ether; chromatographing the solution on a column containing activated neutral alumina to form several bands on the column from the petroleum ether solution; eluting the lowest band with petroleum ether; thereafter eluting the second band with cyclohexane; then eluting the main band with diethyl ether; and evaporating the solvent from the main band to isolate the product having composition $(C_{15}H_{16}Fe)_n$ as determined by elemental chemical analysis.

4. A ferrocenyl polymer of the following structure:

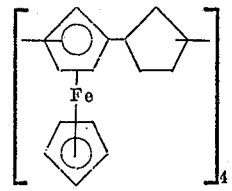

5. A ferrocenyl polymer of the following structure:

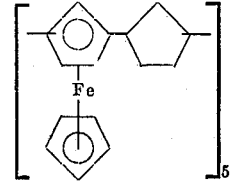

6. A ferrocenyl polymer of the following structure:

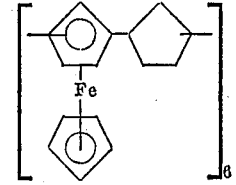

References Cited

UNITED STATES PATENTS 2,831,879   4/1958   Weinmayr _____ 260—439

OTHER REFERENCES

Cottis et al.: "Chemistry and Industry," May 25, 1963, pp. 860–1.

Cottis et al.: "Journal of Polymer Science," Pt. B, vol. 2, pp. 295–299, March 1964.

Goldberg: "Jour. American Chem. Society," vol. 84 (1962), p. 3022.

Nesmeyanov et al.: "Doklady Adad. Nauk SSR," vol. 126 (1959), pp. 307–9.

Weinmayr II: "Jour. American Chem. Soc.," vol. 77 (1955) pp. 3009–11.

SAMUEL H. BLECH, *Primary Examiner.*